United States Patent
Savidge

(10) Patent No.: US 8,248,481 B2
(45) Date of Patent: Aug. 21, 2012

(54) METHOD AND APPARATUS FOR MOTION ARTIFACT REMOVAL IN MULTIPLE-EXPOSURE HIGH-DYNAMIC RANGE IMAGING

(75) Inventor: Laura Savidge, Sunnyvale, CA (US)

(73) Assignee: Aptina Imaging Corporation, George Town (KY)

( * ) Notice: Subject to any disclaimer, the term of this patent is extended or adjusted under 35 U.S.C. 154(b) by 570 days.

(21) Appl. No.: 12/420,520

(22) Filed: Apr. 8, 2009

(65) Prior Publication Data

US 2010/0259626 A1  Oct. 14, 2010

(51) Int. Cl.
*H04N 5/225* (2006.01)
(52) U.S. Cl. .......... 348/221.1; 348/208.4; 348/222.1; 348/362
(58) Field of Classification Search .......... 348/221.1, 348/222.1, 362, 208.4
See application file for complete search history.

(56) References Cited

U.S. PATENT DOCUMENTS

| | | | |
|---|---|---|---|
| 6,842,196 B1 | 1/2005 | Swift et al. | |
| 6,879,731 B2 | 4/2005 | Kang et al. | |
| 7,061,524 B2 | 6/2006 | Liu et al. | |
| 7,142,723 B2 | 11/2006 | Kang et al. | |
| 7,239,805 B2 | 7/2007 | Uyttendaele et al. | |
| 7,852,374 B2 * | 12/2010 | Kaneko et al. | 348/208.4 |
| 2002/0154829 A1 * | 10/2002 | Tsukioka | 382/254 |
| 2007/0077055 A1 * | 4/2007 | Tominaga et al. | 396/256 |
| 2007/0242900 A1 | 10/2007 | Chen et al. | |
| 2008/0253758 A1 * | 10/2008 | Yap et al. | 396/234 |
| 2009/0059044 A1 * | 3/2009 | Tay | 348/294 |
| 2009/0232416 A1 * | 9/2009 | Murashita et al. | 382/294 |

* cited by examiner

*Primary Examiner* — Gevell Selby
(74) *Attorney, Agent, or Firm* — Nancy Y. Ru

(57) ABSTRACT

Methods and apparatuses for correcting image artifacts in a high dynamic range image formed by combining a plurality of exposures taken at different integration periods. A determination is made as to whether there is motion between the exposures. If motion is detected, pixel signal values chosen are replaced with pixel signal values from another exposure.

20 Claims, 9 Drawing Sheets

METHOD AND APPARATUS FOR MOTION ARTIFACT REMOVAL IN MULTIPLE-EXPOSURE HIGH-DYNAMIC RANGE IMAGING

FIELD OF THE INVENTION

Disclosed embodiments relate generally to imagers, and more particularly to methods and apparatuses for motion artifact removal in multiple-exposure high-dynamic range imaging.

BACKGROUND OF THE INVENTION

Many portable electronic devices such as cameras, cellular telephones, personal digital assistants (PDAs), MP3 players, computers and other devices include an imager for capturing images. One example of an imager is a complementary metal-oxide semiconductor ("CMOS") imager. A CMOS imager includes a focal plane array of pixels, each one of the pixels including at least one photosensor overlying a substrate for accumulating photo-generated charge in the underlying portion of the substrate. Each pixel may include at least one electronic device such as a transistor for transferring charge from the photosensor to a storage region.

Each pixel has corresponding readout circuitry that includes at least a charge storage region connected to the gate of an output transistor, an output source follower transistor, a reset transistor for resetting the charge storage region to a predetermined charge level, and a row control transistor for selectively connecting the readout circuitry to a column line. The charge storage region may be constructed as a floating diffusion region. Each pixel may have independent readout circuitry, or may employ common element pixel architecture (CEPA), that may include multiple pixels sharing the same readout circuitry.

In a CMOS imager, the active elements of a pixel circuit perform the necessary functions of: (1) photon to charge conversion; (2) accumulation of image charge; (3) resetting the storage region to a known state; (4) transfer of charge to the storage region accompanied by charge amplification; (5) selection of a pixel circuit for readout; and (6) output and amplification of a signal representing a reset level and pixel charge. Photo charge may be amplified when the charge moves from the initial charge accumulation region to the storage region. The charge at the storage region is typically converted to a pixel output voltage by a source follower output transistor.

Image sensors have a characteristic dynamic range. Dynamic range refers to the range of incident light that can be accommodated by an image sensor in a single frame of pixel signal values. It is desirable to have an image sensor with a high-dynamic range in order to image scenes that generate high-dynamic range incident signals, such as indoor rooms with windows to the outside, outdoor scenes with mixed shadows and bright sunshine, night-time scenes combining artificial lighting and shadows, and many others.

The dynamic range for an image sensor is commonly defined as the ratio of its largest non-saturating signal to the standard deviation of its noise under dark conditions. The dynamic range is limited on an upper end by the charge saturation level of the sensor, and on a lower end by noise imposed limitations and/or quantization limits of the analog-to-digital converter used to produce the digital image. When the dynamic range of an image sensor is too small to accommodate the variations in light intensities of the imaged scene e.g., by having a low saturation level, image distortion may occur.

A common method of high-dynamic range imaging is the multiple exposure capture method, wherein several images are captured at different integration periods and are then combined to create a high-dynamic range image. With multiple exposure image capture (and in any high-dynamic range imaging system using sequential exposures including lateral overflow methods), a moving object will be registered at different pixel positions in each exposure. The registration discrepancy is most severe with frame-sequential multiple exposure capture, but can also be significant in row-sequential multiple exposure capture, such as may be used in CMOS imagers. If one of the integration periods is long relative to the scene motion, the object shape will appear blurred and elongated in the direction of motion in this exposure.

When the multiple images are combined using a basic multiple exposure combination method, the discrepancy in position and shape of the moving object in the multiple exposures will result in misregistration of the object in the combined image. This may cause image artifacts such as a bright outline and/or a noisy region (see, e.g., FIG. 3, described in more detail below). These image artifacts degrade the image and are undesirable.

Accordingly, there is a desire for a method and apparatus which is able to identify and remove the image artifacts caused by motion in multiple-exposure high-dynamic range imaging.

DETAILED DESCRIPTION OF THE INVENTION

In the following detailed description, reference is made to the accompanying drawings which form a part hereof, and in which are shown by way of illustration specific embodiments that may be practiced. It should be understood that like reference numbers represent like elements throughout the drawings. These example embodiments are described in sufficient detail to enable those skilled in the art to practice them. It is to be understood that other embodiments may be utilized, and that structural, material, and electrical changes may be made, only some of which are discussed in detail below.

Disclosed embodiments relate to methods and apparatuses for detecting and removing image artifacts caused by motion which occur when using multiple-exposure high-dynamic range imaging. As previously discussed, multiple-exposure capture and combination is a common method of high-dynamic range imaging, however when scene or camera motion is present, misregistration can create an artifact characterized by a bright outline and/or a noisy region in the final image. This artifact can be present in any high-dynamic range imaging system which uses sequential exposures.

Disclosed embodiments identify motion by detecting inconsistencies in the multiple-exposure data. Disclosed embodiments remove bright outline artifacts by replacing the artifact region with dark pixel values from a different exposure, thereby making the region blend in to the surrounding area. Disclosed embodiments remove noise artifacts by identifying and filtering the noisy region.

Disclosed embodiments may be used with either rolling shutter or global type image sensors. When used with a rolling shutter image sensor, the disclosed embodiments are able to remove horizontal motion artifacts without requiring line buffers. If line buffers are available (e.g., as in global shutter mode), disclosed embodiments may remove motion artifacts in both vertical and horizontal directions.

Figure 1:
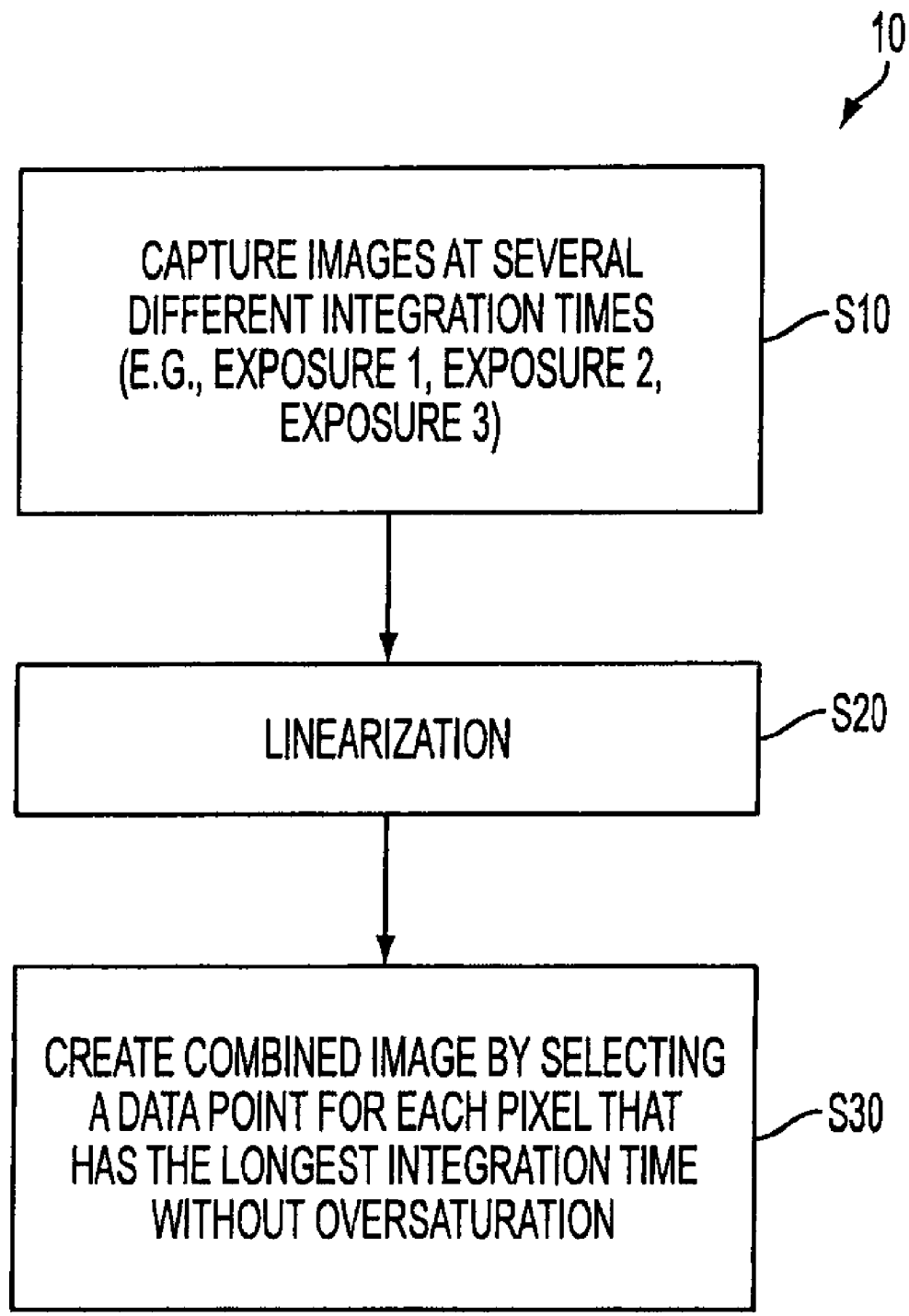
FIG. 1 is a flowchart describing a method for multiple-exposure capture and combination.
Figure 2:
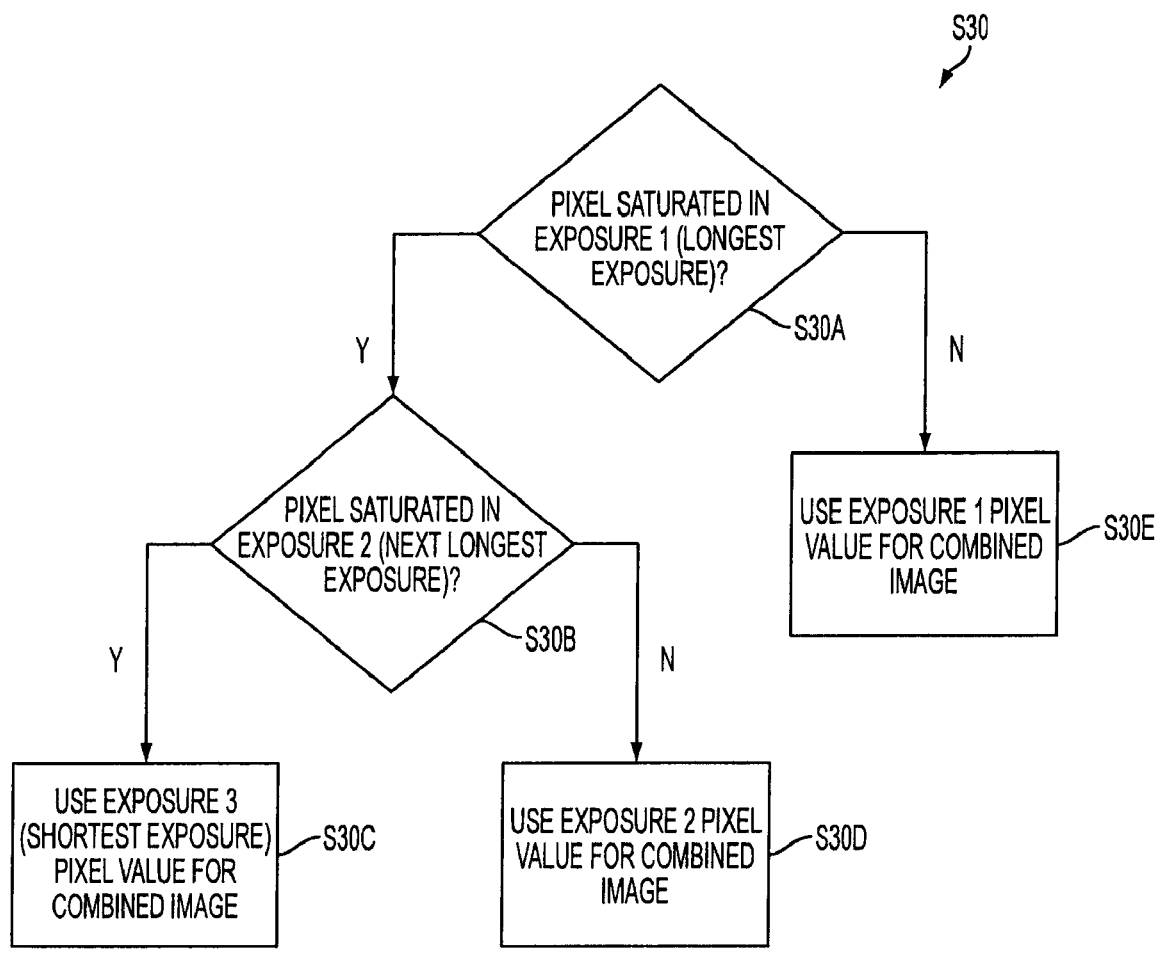
FIG. 2 is a flowchart describing step S30 of FIG. 1 in more detail.

The basic method 10 for performing multiple-exposure capture and combination is described with reference to FIGS. 1 and 2. It should be noted that the illustrated example shows three exposures, but that any number of exposures may be used.

First, at step S10, several images (Exposure 1, Exposure 2, Exposure 3) are captured for respective different integration periods. In this example, the integration period of Exposure 1 (Int1) is the longest integration period and the integration time of Exposure 3 (Int3) is the shortest. The integration period of Exposure 2 (Int2) is between those of Exposure 1 and Exposure 3. As captured, the pixel signal values associated with the image taken at each exposure correspond to different light intensities. This is because the integration period is different for each exposure. To make the light versus pixel signal value relationship the same for all three exposures, the pixel signal values for the second and third exposures are multiplied by an exposure ratio R12, R13, respectively. This is referred to as "linearization" and is performed at step S20.

The corresponding exposure ratios are represented by Equations (1) and (2):

$$R12 = Int1/Int2 \quad (1)$$

$$R13 = Int1/Int3 \quad (2)$$

Thus, the linearized exposures (Exp1_lin, Exp2_lin, Exp3_lin) are represented by Equations (3), (4) and (5):

$$Exp1\_lin = Exp1 \quad (3)$$

$$Exp2\_lin = R12 * Exp2 \quad (4)$$

$$Exp3\_lin = R13 * Exp3 \quad (5)$$

After the linearization process, every pixel in a pixel array has three pixel signal values associated with it (one from each exposure) and each pixel signal value has the same light versus signal value relationship. At step S30, the basic multiple-exposure combination method selects the pixel signal value for each pixel that is to be used for the final combined image by selecting the pixel signal value that corresponds to the longest integration period for which the particular pixel is not saturated. This method offers the best signal-to-noise ratio with the highest dynamic range. FIG. 2 illustrates step S30 for a particular pixel in more detail and is described below. The pixel signal value determined in accordance with FIGS. 1 and 2 can also be referred to as the "base pixel signal value."

At step S30A, it is determined if a particular pixel is saturated in Exposure 1 (longest exposure). This determination may be made by any method known in the art. If it is not saturated, the pixel value from Exposure 1 is selected, at step S30E, for use in the combined image for that particular pixel location. If the pixel is saturated in Exposure 1, then at step S30B, it is determined if that pixel is saturated in Exposure 2 (next longest exposure). If it is not, the pixel value from Exposure 2 is selected, at step S30D, for use in the combined image for that particular pixel location. If the pixel is saturated in Exposure 2, the pixel value from Exposure 3 (shortest exposure) is selected, at step S30C, for use in the combined image for that particular pixel location. It should be noted that if more than three exposures are used, that the same steps would be repeated for each exposure, such that the final combined image is the result of selecting a pixel signal value for each pixel location which corresponds to the longest integration period for which the particular pixel is not saturated. It should also be noted that if only two exposures are used, the value from Exposure 2 is used if, at step S30A, it is determined that the pixel is saturated in Exposure 1.

Figure 3:
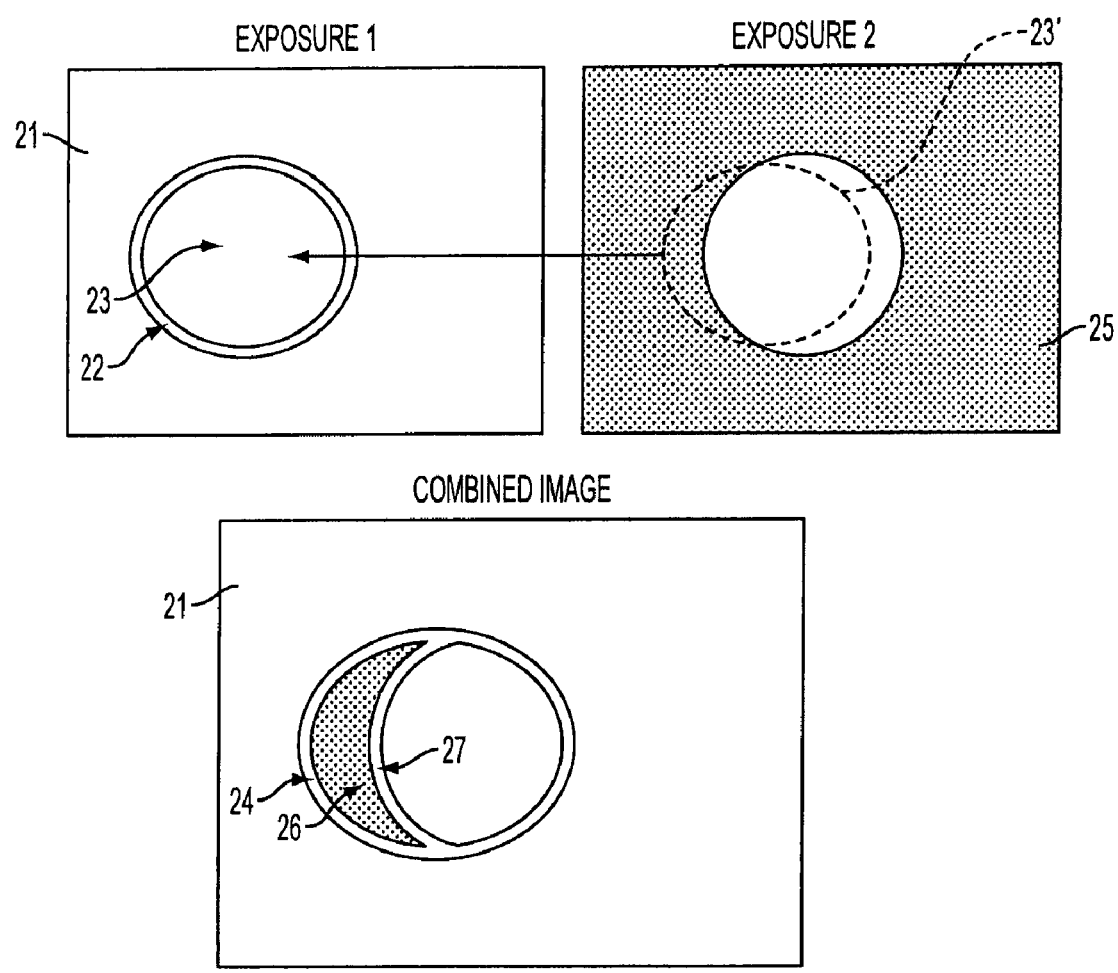
FIG. 3 illustrates the bright outline and noisy region image artifacts of an image taken using multiple-exposure capture and combination.

In a case of a bright moving object and a dark background (e.g., a scene including car headlights at night), the bright object is not likely to cleanly saturate the affected pixels in the long exposure image, but will instead have a "roll-off region" surrounding the saturated region. The roll-off region is comprised of bright, but unsaturated, pixels. Using the method described with respect to FIGS. 1 and 2 may result in a bright outline in the final image, which corresponds to the shape and position of the bright object at the time of the long exposure. This is illustrated, for example, in FIG. 3. Only two exposures are shown in the example of FIG. 3. In applying the method of FIGS. 1 and 2 to the image of FIG. 3, the pixels for which the Exposure 1 values are used for the combined image (step S30E) include the dark background section 21 as well as the bright outline portion 22. For region 23, the pixels in Exposure 1 are saturated; therefore, the pixel values from portion 23' of Exposure 2 are used for the combined image (step S30D). It should be noted that the "pixel values" of various exposures refer to the linearized values for that particular exposure, as previously discussed.

As can be seen in FIG. 3, since the object has moved during the image capture of Exposure 1 and Exposure 2, the portion 23' of Exposure 2 corresponding to the saturated portion 23 of Exposure 1 will include part of the bright object as well as some of the Exposure 2 dark background 25. The combined image thus includes a bright outline 24 (the roll-off region) surrounded by dark pixels. This outline 24 image artifact can be noticeable in the combined image.

Further, while the signal levels are the same, the portion 26 of the dark background 25 taken from Exposure 2 will be significantly noisier than the portions of the dark background 21 taken from Exposure 1, since Exposure 1 was captured using a lower signal-to-noise ratio than was used for Exposure 2. While the basic multiple-exposure combination method is designed to only use pixels from Exposure 2 having relatively high signal-to-noise ratio, the scene motion results in the use of pixels from Exposure 2 having relatively low signal-to-noise ratio.

The outline and noise artifacts (seen in the combined image of FIG. 3) occur not only in the case of a bright object moving across a dark background, but may also occur in the case of a dark object moving across a bright background or if there is camera motion. In the case of a dark object moving across a bright background, the bright outline falls in the middle of the dark object, and part of the object is noisy. In the case of camera motion or panning, all boundaries between pixels using values taken from Exposure 1 and pixels using values taken from Exposure 2 pixel values may experience these artifacts. Accordingly, a method of detecting motion and removing these types of outline and noise artifacts is desired.

A method of detecting motion during multiple-exposure capture in accordance with disclosed embodiment is now described. As previously described, in multiple-exposure high-dynamic range imaging, every pixel has (at least) two pixel signal values, one from each exposure. If the pixel did not saturate in any of the exposures, then Equation (6) will be satisfied:

$$\text{Exp1\_lin} \approx \text{Exp2\_lin} \quad (6)$$

In the absence of noise these values will be equal. If the pixel saturates in one or more of the exposures, then Equation (7) should be approximately satisfied:

$$\text{Exp1\_lin} \leq \text{Exp2\_lin} \quad (7)$$

This is because saturation will occur in the longest exposure first and will always result in a lower value than in non-saturated exposures after linearization.

According to disclosed embodiments, motion between exposures can be detected by identifying pixels for which Equation (7) is not satisfied. Specifically, if a pixel is very bright or saturated in Exposure 1 but is very dark in Exposure 2, then motion is likely to have occurred between the exposures. In this case, Equation (8) will be satisfied instead:

$$\text{Exp1\_lin} >> \text{Exp2\_lin} \quad (8)$$

Therefore, motion may be detected at an individual pixel location using Equation (9):

$$\text{Exp2\_lin} - \text{Exp1\_lin} < \text{diff\_thresh} \quad (9)$$

wherein diff_thresh is a predetermined threshold constant value, which is less than zero (motion detection threshold). If Equation (9) is not satisfied, then there is no motion at the particular pixel. While, theoretically, using a value of zero for this motion detection threshold would suggest the presence of motion, using a value lower than zero for the threshold makes the determination more robust to noise.

The motion detection technique just described identifies a region of the image which is very bright (or saturated) in Exposure 1 (long exposure) but is very dark in Exposure 2 (short exposure). In the case of a bright object moving across a dark background, for example, this area corresponds to region 26 of FIG. 3. Using this method alone, however, may not "catch" all of the pixels that cause motion artifacts in the final image. This is because pixels that are of medium brightness, for example, may not be bright enough for motion to be detected, but they are bright enough to be noticeably different from the dark background (e.g., outline 24, FIG. 3). Setting the motion detection threshold closer to zero in order to guarantee that motion is detected at these outline pixels could lead to falsely detected motion elsewhere in the image.

While motion detection is not guaranteed for the pixels that form outline 24 themselves, it is much more likely these pixels will be spatially close to other pixels for which motion is detected (e.g., region 26). Thus, in order to remove the outline artifact and to reduce the possibility of missing pixels for which motion should be detected, the multiple-exposure combination method can be modified to force the use of pixel values from Exposure 2 not only for pixels having detected motion, but also for pixels that are spatially close to several pixels with detected motion.

Once motion is detected, the previously discussed motion outline artifact can be removed. This can be done by modifying the multiple-exposure combination method described above with reference to FIGS. 1 and 2 to force the use of pixel values from Exposure 2 for pixels that have detected motion, thus removing the bright outline 24 image artifact (FIG. 3). The "base pixel signal value" is thus replaced with a "replacement pixel signal value" from Exposure 2.

Figure 4:
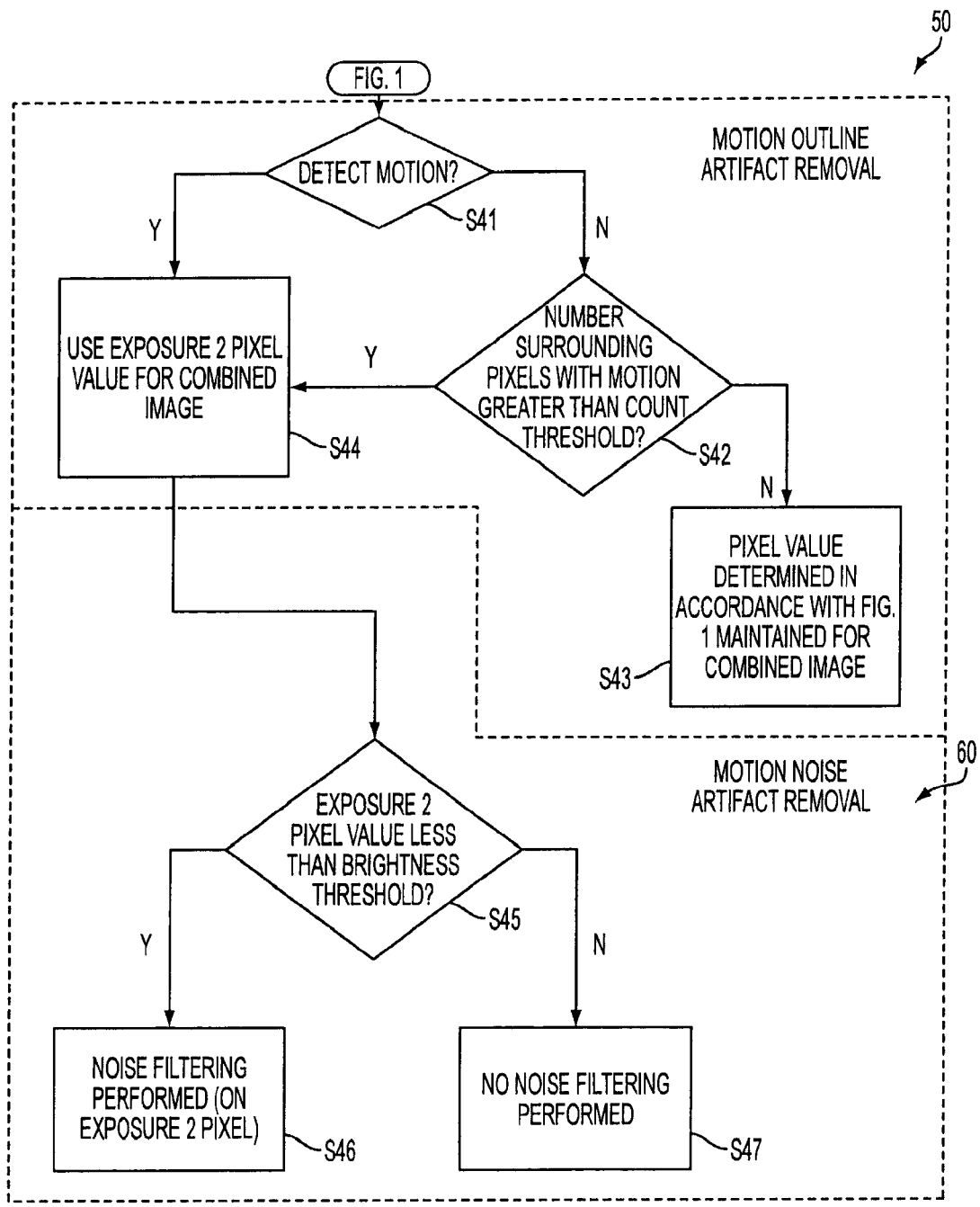
FIG. 4 is a flowchart showing a method of image correction in accordance with disclosed embodiments.

An example of a method 50 of motion outline artifact removal is now described. Referring to FIG. 4, the performance of outline artifact removal on individual pixels occurs as described. Before operation of this method 50, the basic multiple-exposure combination method 10 has already been performed on the pixels (FIG. 1). Then, for a particular pixel, it is determined at step S41, using Equation (9), whether there is motion at the pixel. If there is no motion at the pixel, it is determined at step S42, whether the number of surrounding pixels for which motion was detected is greater than a count threshold. The size and shape of the region searched for motion detected pixels is preset based on hardware constraints. If at step S42 it is determined that the number of surrounding pixels for which motion was detected is less than the count threshold, then the pixel value determined in accordance with the basic multiple-exposure combination method is retained, at step S43. If motion is detected at step S41 or it is determined that the number of surrounding pixels for which motion was detected is greater than the count threshold at step S42, then the pixel value from the basic multiple-exposure combination method is replaced with the value for that pixel from Exposure 2 at step S44. In this way, motion outline artifacts can be identified and removed.

Referring again to the example of FIG. 3, the pixels identified as having motion or being spatially close to several pixels with detected motion would fall into one of three areas: FIG. 3, regions 24, 26 and 27 (edge of bright object). In the outline artifact removal process, the pixels of region 24 (which would use pixel values from Exposure 1 in accordance with the basic multiple-exposure combination method) are replaced with pixel values from Exposure 2. These pixel values from Exposure 2 correspond to the dark background seen in Exposure 2 after the object has moved away from that position. The replacement of the pixels of region 24 with pixel values from Exposure 2 makes regions 26 and 24 correspond to the same scene. This removes the outline artifact 24. The basic multiple-exposure combination method 10 (FIGS. 1 and 2) already selects pixel values from Exposure 2 for regions 26 and 27, thus these regions are not modified by the motion outline artifact removal process.

The previously mentioned motion noise artifact is created because pixel values from Exposure 2, having low signal-to-noise ratio, are selected for the combined image. In the example of FIG. 3, the noise artifact appears in the pixels of regions 24 and 26 (after the motion outline artifact removal process). Noise filtering should be performed on these pixels to remove the motion noise artifact. The outline artifact removal process has already identified the pixels that are spatially close to several pixels with detected motion. Since the pixels in region 27 (which are included in the motion outline artifact removal process) are not noisy, they should not be included in the noise filtering. Thus, the noise artifact identification and removal method requires the exclusion of the pixels of region 27 from the pixels identified as having motion for use in the noise artifact correction.

A method 60 of motion noise artifact identification and removal is now described. Referring still to FIG. 4, the performance of noise artifact removal on individual pixels is described. In order to identify and exclude the pixels of region 27 from the noise artifact removal method, additional criteria are used. Since the noisy region must be a dark region of the image, an additional requirement that the Exposure 2 pixel value be less than a brightness threshold value is imposed. Thus, for pixels for which motion is detected at step S41 or for which it is determined that the number of surrounding pixels for which motion was detected is greater than the count threshold at step S42 (pixels for which the pixel value from the basic multiple-exposure combination method is replaced with the value for that pixel from Exposure 2 at step S44), it is determined whether the Exposure 2 pixel value is less than the brightness threshold value (P2_thresh), at step S45. If it is, then noise filtering is performed on the particular pixel at step S46. Any known noise filter may be applied once the pixels are identified. If the Exposure 2 pixel value is greater than the brightness threshold value, the unfiltered pixel value is used (step S47).

Figure 5A:
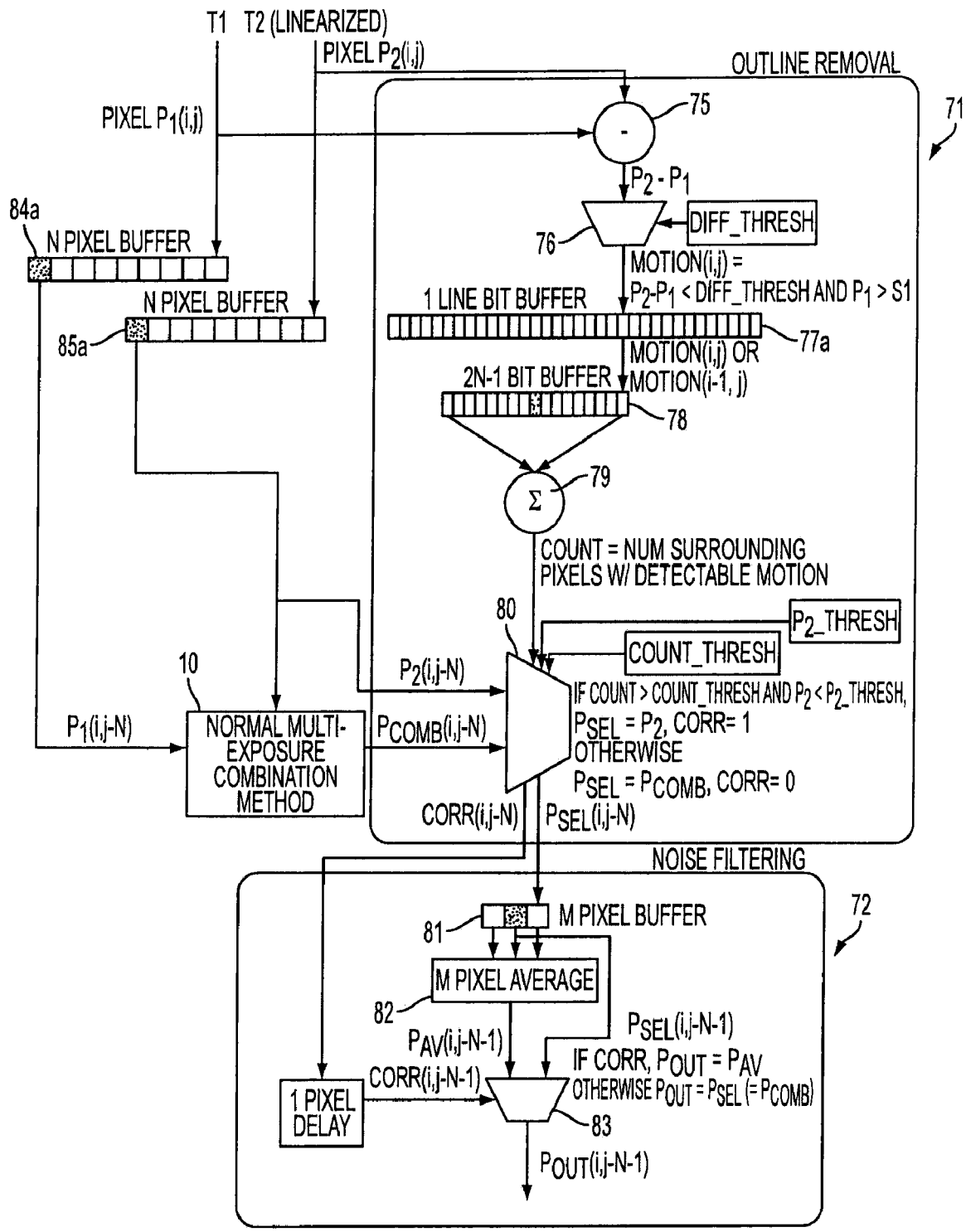
FIG. 5A illustrates an example hardware embodiment for implementing the method of image correction in a horizontal direction in accordance with disclosed embodiments.
Figure 5B:
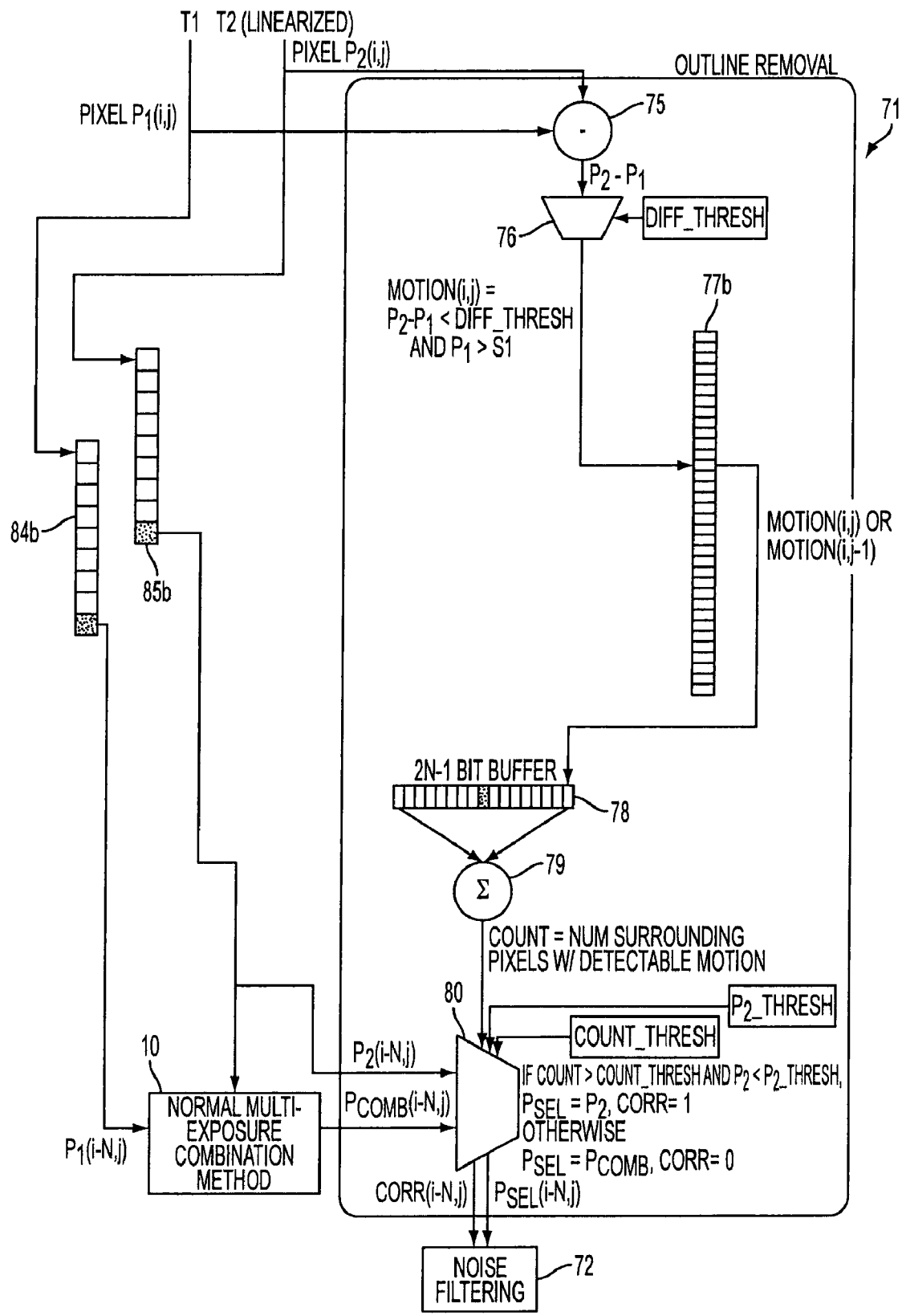
FIG. 5B illustrates an example hardware embodiment for implementing the method of image correction in a vertical direction in accordance with disclosed embodiments.

The block diagram in FIGS. 5A and 5B illustrate example hardware embodiments for implementing the previously described methods of FIG. 4. In the exemplary embodiment of FIG. 5A, horizontal motion is corrected for a rolling shutter image sensor with a Bayer color filter array pattern. This embodiment requires no pixel line buffers and is described for a two exposure high-dynamic range system. For a multiple-exposure high-dynamic range system with more than two exposures, the system should be applied to the two longest exposures.

Outline removal hardware 71 and noise filtering hardware 72 are illustrated in FIG. 5A. As can be seen, the linearized pixel values from Exposure 1 (P1) and Exposure 2 (P2) for a pixel (i,j) are provided as inputs to the outline removal hardware 71 and input into subtractor 75. (These pixel values are also stored in N pixel buffers 84a, 85a, from which the pixel values are input into the basic multi-exposure combination method 10 and logic circuit 80, as described in more detail below). Subtractor 75 subtracts the value of Exposure 1 (P1) from the value of Exposure 2 (P2) and inputs the subtraction result (P2−P1) to logic circuit 76. Then, it is determined if motion is present at a particular pixel by comparing this subtraction result to the motion detection threshold (diff_thresh), which is also an input into logic circuit 76. Logic circuit 76 also compares P1 to a value S1. S1 is the threshold pixel signal value for Exposure 1 pixels over which the Exposure 2 pixel signal value is used in the combined image (e.g., that point at which Exposure 2 pixel signal values are chosen to replace Exposure 1 pixel signal values at step S30). In the most basic combination method (e.g., the method of FIG. 1), S1 is the saturation value of the Exposure 1 pixel. In a thresholding or blending scheme, S1 is the highest Exposure 1 pixel signal value before Exposure 2 pixel signal values start being used. If the difference of P2 minus P1 is less than the diff thresh and P1 is greater than S1, then motion is detected at the pixel (motion is set to true e.g., value of "1"). The additional check in the motion detection step (P1>S1) ensures that the pixels being modified not only contain motion, but also a visual error in the combined image by determining whether pixels detecting motion fall into a region where there is likely an outline artifact, such as e.g., region 26 (described above; FIG. 3).

The motion detection result is stored in buffer 77a. This buffer 77a is used in this implementation because a Bayer color filter array pattern does not have every color present on a single row of the array. If the scene coloring is such that motion can only be detected for pixels of a single color and that color is only present in every other row (i.e., red or blue), this line buffer 77a is needed for motion to be detected in every row. In other words, if motion can only be detected in red pixels, line buffer 77a is used to make sure that motion is still "detected" for adjacent pixels in rows not having red pixels. Without buffer 77a, horizontal streaking artifacts would be seen and there would be color error in the region of motion after the image is demosaiced. Buffer 77a includes 1 bit per pixel line and stores the motion determination for each row. If motion is found (motion=true) for the particular pixel or for the pixel in the adjacent row (i-1,j), then a value of true for "motion" is sent to buffer 78. Buffer 78 stores the results of the motion detection for the current pixel and for each of the surrounding pixels. Whether or not motion is detected at each individual pixel is determined in a similar manner as that just described.

The number of surrounding pixels with detectable motion is counted (count) at counter 79. This result (count), P2_thresh and count_thresh are provided as inputs to logic circuit 80. The results of the basic multi-exposure combination method 10 and the Exposure 2 pixel values (P2) (from N pixel buffer 85a) are also provided as inputs to logic circuit 80. Logic circuit 80 determines if count is greater than the count threshold (count_thresh) AND if P2 is less than the brightness threshold (P2_thresh). If both of these conditions are true, then the pixel value (Psel) is set to the value of the pixel from Exposure 2 (P2) and the noise correction variable (corr) is set to true (e.g., value of "1"). If one or both of these conditions are not true, then the pixel value (Psel) is set to the value from the basic multi-exposure combination method 10 (Pcomb) and the noise correction variable (corr) is set to false (e.g., value of "0").

In this example hardware implementation, the P2<P2_thresh requirement is also used as an additional check in the outline removal block 71. As described above with respect to method 60, this determination is required by the noise filtering block 72 to determine whether noise correction is needed. By including this check in the outline removal block 71, a bright Exposure 2 pixel is prevented from creating a new artifact in the middle of an otherwise dark region, where the moving object or background is textured. Thus, in the example hardware implementation of FIG. 5A, the determinations of whether motion outline artifact correction and noise correction are needed are combined into a single logic circuit 80.

In the noise filtering block 72, simple 1-D pixel averaging may be performed for the noise filtering, though other known noise filtering techniques may be used. An m pixel buffer 81 inputs the m pixel values (3 are shown in FIG. 5A), into logic circuit 82 which calculates an m-pixel average (Pav). The m-pixel average (Pav), the selected pixel value (Psel) and the noise correction variable (corr) are input into logic circuit 83, where if the noise correction variable (corr) equals true, the m-pixel average (Pav) is output and if the noise correction variable (corr) equals false, the selected pixel value (Psel) (which incidentally must also be Pcomb) is output for the final pixel signal value for the image. It should be noted that the filtering method can be modified to be more complex if more resources are available, or more optimized for hardware if needed. For example, a 4-pixel average can be used instead of a 3-pixel average, to simplify the hardware implementation. The pixel signal values output from FIG. 5A undergo further known image processing steps, such as demosaicing.

In an example embodiment, the value of N (size of buffers 84a, 84b, 85a, 85b) is 12. The motion detection threshold (diff_thresh) may be set to a value between 50 to 400 (based on pixel signal values being 12 bits) and more preferably may be set to 200. The particular value chosen for the motion detection threshold relates to the robustness of the motion determination to noise in the image. A lower value for diff_thresh results in a system which is less robust to noise. The brightness threshold value (P2_thresh) may be set to 3000, which varies based on the bit depth of the pixel signal values (12 bits in this example). The count threshold (count_thresh) may be set to a range of 2 to 10, and more preferably may be set to 7. The value of the count threshold varies depending on the buffer size that is used (7 corresponds N=12).

FIG. 5B illustrates an example hardware implementation for vertical correction. To allow for vertical correction, line buffers in the vertical direction are needed to store information for the motion detection in the vertical direction. As can be seen in FIG. 5B, the buffers 77b, 84b, 85b are vertical buffers, but otherwise, the technique is the same as the one used for horizontal correction and described above with reference to FIG. 5A. Additionally, horizontal and vertical correction may both be implemented by combining FIGS. 5A and 5B. The technique is implemented in the same manner as described above with reference to FIG. 5A, just simultaneously in two dimensions instead of in one dimension.

Figure 6:
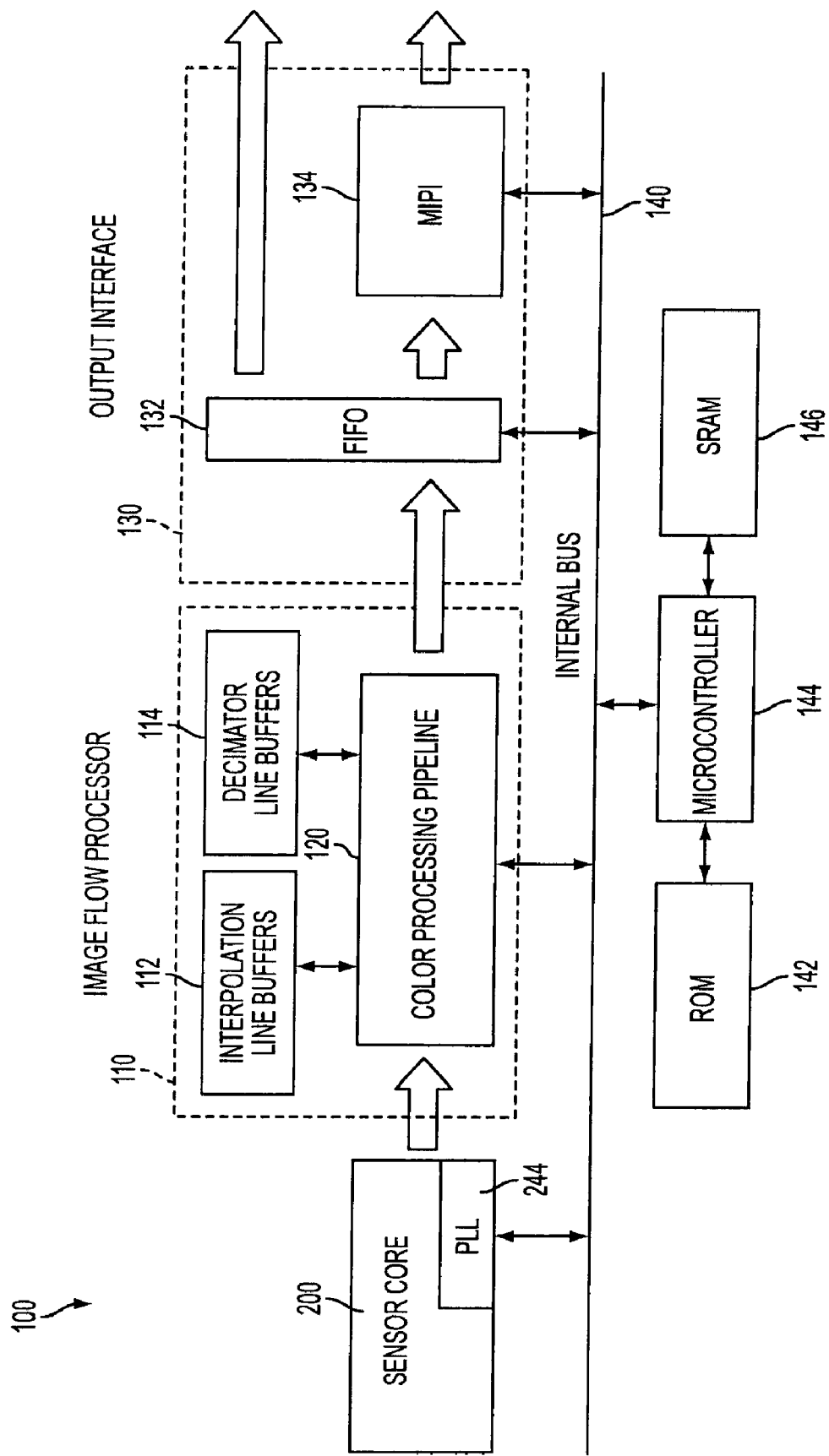
FIG. 6 is a block diagram of a system-on-a-chip imager implementing a disclosed embodiment.

FIG. 6 illustrates a block diagram of a system-on-a-chip (SOC) imager 100 which implements disclosed embodiments and which may use any type of imager array technology, e.g., CCD, CMOS, etc. The imager 100 comprises a sensor core 200 that communicates with an image processor circuit 110 connected to an output interface 130. A phase-locked loop (PLL) 244 is used as a clock for the sensor core 200. The image processor circuit 110, which is responsible for image and color processing, includes interpolation line buffers 112, decimator line buffers 114, and the color processing pipeline 120. One of the functions of the image processor circuit 110 is the performance of image correction in accordance with disclosed embodiments. Image processor circuit 110 may also be implemented as a digital hardware circuit, e.g., an ASIC, a digital signal processor (DSP) or may even be implemented on a stand-alone host computer.

The output interface 130 includes an output first-in-first-out (FIFO) parallel buffer 132 and a serial Mobile Industry Processing Interface (MIPI) output 134, particularly where the imager 100 is used in a camera in a mobile telephone environment. The user can select either a serial output or a parallel output by setting registers in a configuration register within the imager 100 chip. An internal bus 140 connects read only memory (ROM) 142, a microcontroller 144, and a static random access memory (SRAM) 146 to the sensor core 200, image processor circuit 110, and output interface 130.

Figure 7:
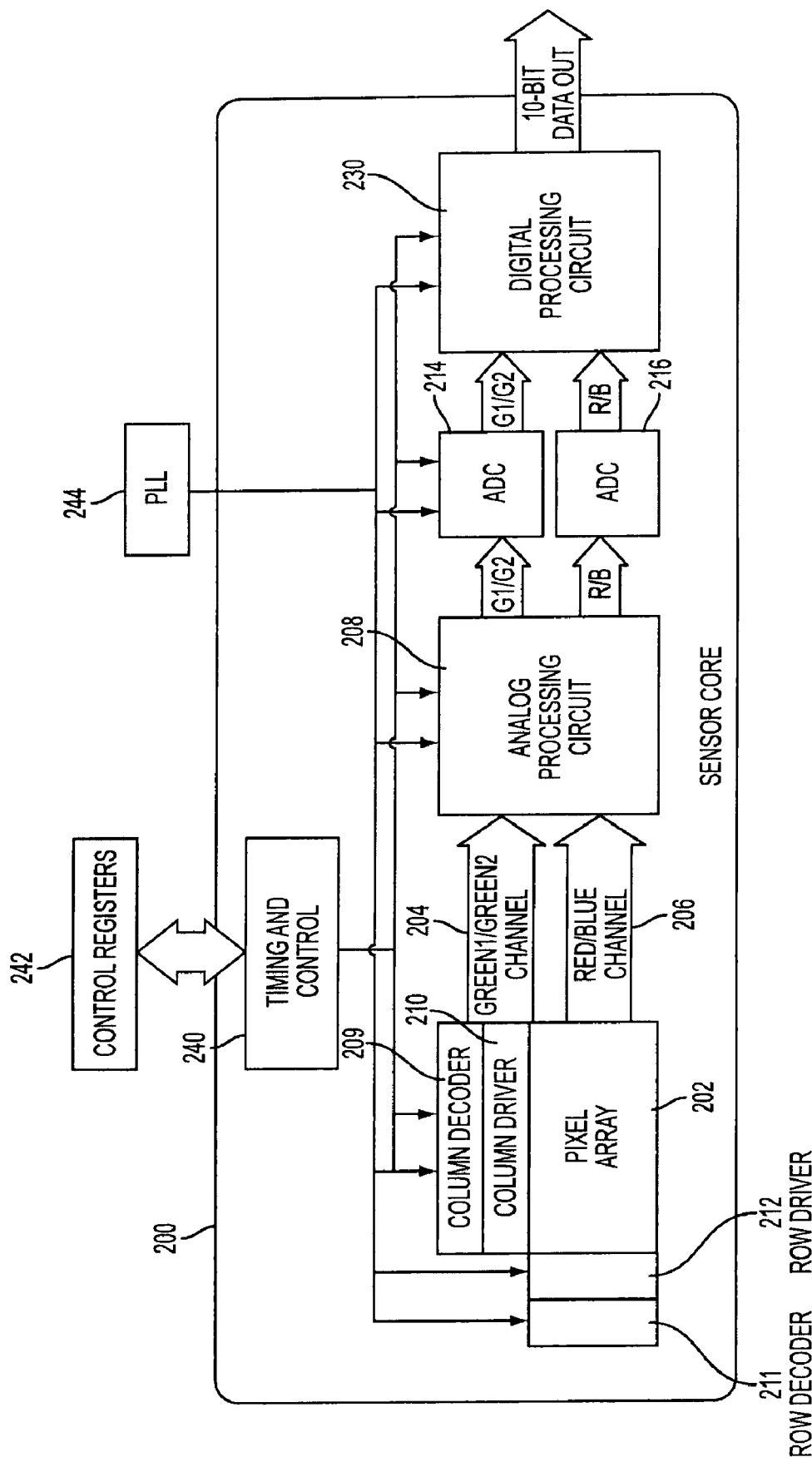
FIG. 7 illustrates an example of a sensor core used in the FIG. 6 imager.

FIG. 7 illustrates a sensor core 200 that may be used in the imager 100 (FIG. 6). The sensor core 200 includes, in one embodiment, a pixel array 202. Pixel array 202 is connected to analog processing circuit 208 by a green1/green2 channel 204 which outputs pixel values corresponding to two green channels of the pixel array 202, and through a red/blue channel 206 which contains pixel values corresponding to the red and blue channels of the pixel array 202.

Although only two channels 204, 206 are illustrated, there are effectively 2 green channels and/or more than the three standard RGB channels. The green1 (i.e., green pixels in the same row as red pixels) and green2 (i.e., green pixels in the same row as blue pixels) signals are read out at different times (using channel 204) and the red and blue signals are read out at different times (using channel 206). The analog processing circuit 208 outputs processed green1/green2 signals G1/G2 to a first analog-to-digital converter (ADC) 214 and processed red/blue signals R/B to a second analog-to-digital converter 216. The outputs of the two analog-to-digital converters 214, 216 are sent to a digital processing circuit 230. It should be noted that the sensor core 200 represents an architecture of a CMOS sensor core; however, disclosed embodiments can be used with any type of solid-state sensor core, including CCD and others.

Connected to, or as part of, the pixel array 202 are row and column decoders 211, 209 and row and column driver circuitry 212, 210 that are controlled by a timing and control circuit 240 to capture images using the pixel array 202. The timing and control circuit 240 uses control registers 242 to determine how the pixel array 202 and other components are controlled. As set forth above, the PLL 244 serves as a clock for the components in the sensor core 200.

The pixel array 202 comprises a plurality of pixels arranged in a predetermined number of columns and rows. For a CMOS imager, the pixels of each row in the pixel array 202 are all turned on at the same time by a row select line and the pixels of each column within the row are selectively output onto column output lines by a column select line. A plurality of row and column select lines is provided for the entire pixel array 202. The row lines are selectively activated by row driver circuitry 212 in response to row decoder 211 and column select lines are selectively activated by a column driver 210 in response to column decoder 209. Thus, a row and column address is provided for each pixel. The timing and control circuit 240 controls the row and column decoders 211, 209 for selecting the appropriate row and column lines for pixel readout, and the row and column driver circuitry 212, 210, which apply driving voltage to the drive transistors of the selected row and column lines.

Each column contains sampling capacitors and switches in the analog processing circuit 208 that read a pixel reset signal Vrst and a pixel image signal Vsig for selected pixels. Because the sensor core 200 uses a green1/green2 channel 204 and a separate red/blue channel 206, analog processing circuit 208 will have the capacity to store Vrst and Vsig signals for green1/green2 and red/blue pixel values. A differential signal (Vrst−Vsig) is produced by differential amplifiers contained in the analog processing circuit 208. This differential signal (Vrst−Vsig) is produced for each pixel value. Thus, the signals G1/G2 and R/B are differential signals representing respective pixel values that are digitized by a respective analog-to-digital converter 214, 216. The analog-to-digital converters 214, 216 supply the digitized G1/G2 and R/B pixel values to the digital processing circuit 230 which forms the digital image output (for example, a 10 bit digital output). The output is sent to the image processor circuit 110 (FIG. 6) for further processing. Although the invention is described using a CMOS array and associated readout circuitry, disclosed embodiments may be used with any type of pixel array, e.g., CCD with associated readout circuitry, or may be implemented on pixel values of an image not associated with a pixel array.

Figure 8:
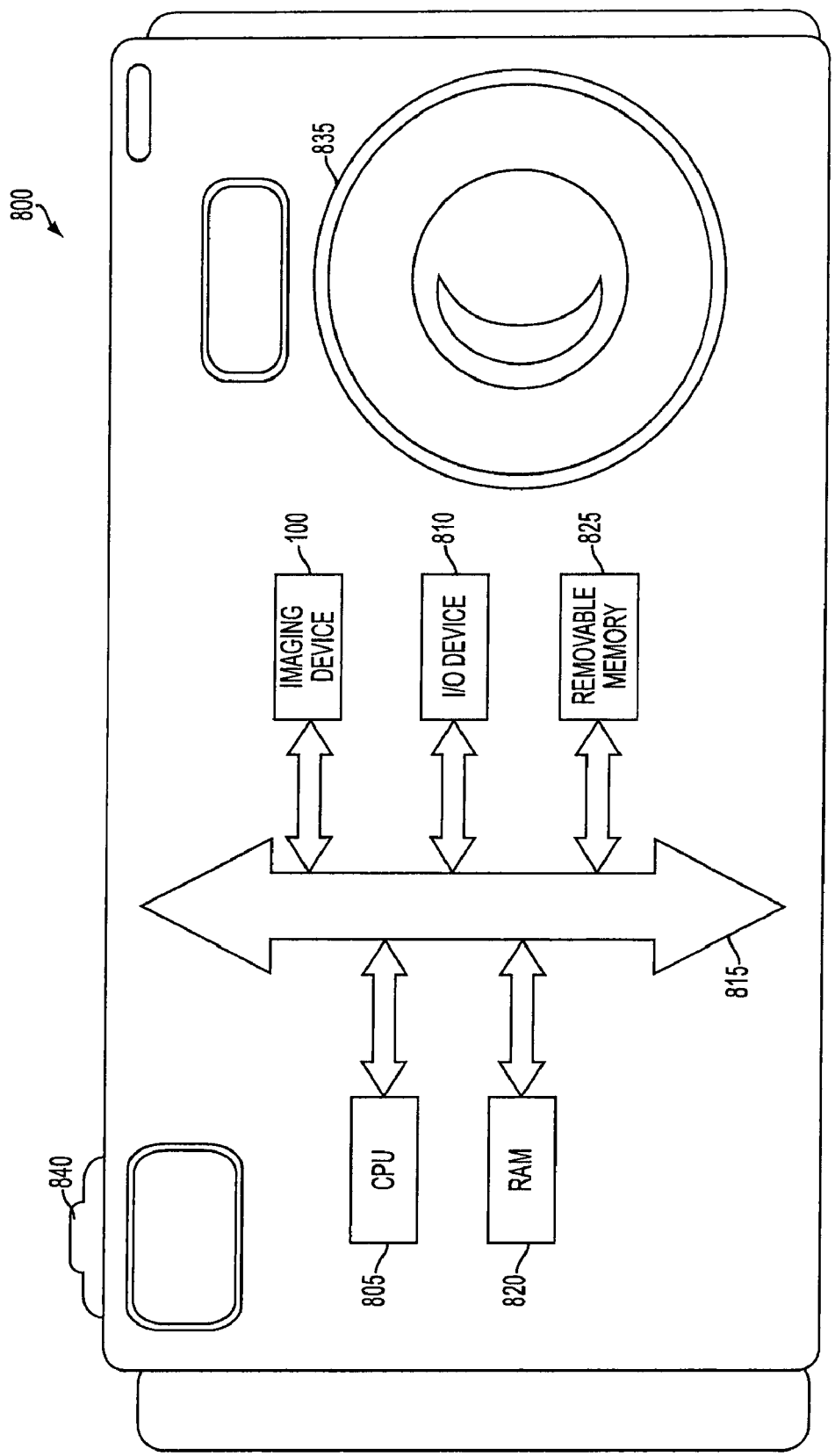
FIG. 8 illustrates a processing system, for example, a digital still or video camera processing system constructed in accordance with disclosed embodiments.

FIG. 8 illustrates a processor system as part of a digital still or video camera system 800 employing a system-on-a-chip imager 100 as illustrated in FIG. 6, which imager 100 provides an image correction operation as described above. The processing system includes a processor 805 (shown as a CPU) which implements system, e.g. camera 800, functions and also controls image flow and image processing. The processor 805 is coupled with other elements of the system, including random access memory 820, removable memory 825 such as a flash or disc memory, one or more input/output devices 810 for entering data or displaying data and/or images and imager 100 through bus 815 which may be one or more busses or bridges linking the processor system components. A lens 835 allows an image or images of an object being viewed to pass to the pixel array 202 of imager 100 when a "shutter release"/"record" button 840 is depressed.

The camera system 800 is only one example of a processing system having digital circuits that could include imagers. Without being limiting, such a system could also include a computer system, cell phone system, scanner, machine vision system, vehicle navigation system, video phone, surveillance system, auto focus system, star tracker system, motion detection system, image stabilization system, and other image processing systems.

It should further be noted that, while the disclosed embodiments describe implementation of the algorithm on the sensor, the sensor may output all of the separate pixel signal values (for the different exposures), and then the algorithm could be done off sensor as well in a separate image processor.

While disclosed embodiments have been described in detail, it should be readily understood that the claimed invention is not limited to the disclosed embodiments. Rather the disclosed embodiments can be modified to incorporate any number of variations, alterations, substitutions or equivalent arrangements not heretofore described.

What is claimed as new and desired to be protected by Letters Patent of the United States is:

1. A method of combining a plurality of images taken at different integration periods into a single combined image, the method comprising:
   determining a base pixel signal value for each pixel location, wherein the base pixel signal value is a pixel signal value from one of the plurality of images which has the longest integration period without being saturated for the particular pixel location;
   detecting whether motion exists at each pixel location between the images; and
   removing a motion image artifact from the combined image by replacing the base pixel signal value with a replacement pixel signal value for pixel locations for which motion is detected, wherein motion is detected at a particular pixel location by determining if a difference between the replacement pixel signal value and the base pixel signal value is less than a non-zero motion detection threshold and wherein the replacement pixel signal value is a pixel signal value at a same location as the base pixel signal value in an image having a shorter integration period than that of the base pixel signal value.

2. The method of claim 1, wherein the replacement pixel signal value is a pixel signal value at a same location as the base pixel signal value in an image having the next shortest integration period than that of the base pixel signal value.

3. The method of claim 1 further comprising removing a motion noise artifact from the combined image by performing noise filtering on pixels for which a value of the replacement pixel signal value is less than a brightness threshold.

4. The method of claim 1, wherein motion is further detected at a particular pixel location if a number of pixels having detected motion that surround the particular pixel is greater than a count threshold.

5. The method of claim 1, wherein the base pixel signal value and replacement pixel signal value are linearized pixel signal values.

6. A method of combining a plurality of images taken at different integration periods into a single combined image, the method comprising:
   determining a base pixel signal value for each pixel location, wherein the base pixel signal value is a pixel signal value from one of the plurality of images which has the longest integration period without being saturated for the particular pixel location;
   detecting whether motion exists at each pixel location between the images; and
   removing a motion image artifact from the combined image by replacing the base pixel signal value with a replacement pixel signal value for pixel locations for which motion is detected, wherein motion is detected at a particular pixel location by determining if a difference between the replacement pixel signal value and the base pixel signal value is less than a motion detection threshold and wherein the pixel signal values are 12 bits and the motion detection threshold is a value between 50 and 400.

7. The method of claim 6, wherein the motion detection threshold is 200.

8. A method of combining a plurality of images taken at different integration periods into a single combined image, the method comprising:
   determining a base pixel signal value for each pixel location, wherein the base pixel signal value is a pixel signal value from one of the plurality of images which has the longest integration period without being saturated for the particular pixel location;
   detecting whether motion exists at each pixel location between the images; and
   removing a motion image artifact from the combined image by replacing the base pixel signal value with a replacement pixel signal value for pixel locations for which motion is detected, wherein motion is detected at a particular pixel location by determining if a difference between the replacement pixel signal value and the base pixel signal value is less than a motion detection threshold, wherein motion is further detected at a particular pixel location if a number of pixels having detected motion that surround the particular pixel is greater than a count threshold, and wherein the count threshold is between 2 and 10.

9. The method of claim 8, wherein the count threshold is 7.

10. A method of combining a plurality of images taken at different integration periods into a single combined image, the method comprising:
    determining a base pixel signal value for each pixel location, wherein the base pixel signal value is a pixel signal value from one of the plurality of images which has the longest integration period without being saturated for the particular pixel location;
    detecting whether motion exists at each pixel location between the images;
    removing a motion image artifact from the combined image by replacing the base pixel signal value with a replacement pixel signal value for pixel locations for which motion is detected; and
    removing a motion noise artifact from the combined image by performing noise filtering on pixels for which a value of the replacement pixel signal value is less than a brightness threshold, wherein the pixel signal values are 12 bits and the brightness threshold is 3000.

11. A method of operating an imaging system, the method comprising:
    acquiring a first exposure of an image having a first integration period;
    acquiring a second exposure of the image having a second integration period, the second integration period being shorter than the first integration period;
    combining the first and second exposures into a single combined image by choosing, for a given pixel location, a pixel signal value from one of the first and second exposures;
    at each pixel location, detecting motion between the first and second exposures, wherein detecting motion at a particular pixel location comprises determining if a difference between a pixel signal value at the particular pixel location from the second exposure and a pixel signal value at the particular pixel location from the first exposure is less than a non-zero motion detection threshold; and correcting the combined image to correct for image artifacts caused by detected motion, wherein correcting the combined image further comprises removing motion artifacts and wherein removing motion artifacts comprises replacing a pixel signal value from the first exposure with a pixel signal value from the second exposure, for pixel locations for which motion is detected.

12. The method of claim 11, wherein combining the first and second exposures comprises selecting, for use in the combined image, a pixel signal value for each pixel location from one of the first or second exposures, wherein the pixel signal value from the first exposure is selected unless the first exposure is saturated at a particular pixel, in which case the pixel signal value from the second exposure is selected.

13. The method of claim 11, wherein the motion artifacts comprises a bright outline on a dark background.

14. The method of claim 11, wherein the motion artifacts comprises a dark outline on a bright background.

15. The method of claim 11, wherein correcting the combined image further comprises removing noise artifacts.

16. The method of claim 15, wherein removing noise artifacts comprises performing noise filtering on pixels for which a replacement pixel signal value is less than a brightness threshold, wherein the replacement pixel signal value is a pixel signal value from the second exposure that has replaced a pixel signal value from the first exposure, for pixel locations for which motion is detected.

17. The method of claim 11, wherein detecting motion at the particular pixel location further comprises determining if a number of pixels having detected motion that surround the particular pixel is greater than a count threshold.

18. An imaging device comprising:
an array of pixels for capturing a plurality of exposures of an image, the plurality of exposures having varying integration periods; and
a processing circuit for processing pixel signals produced by the array, the processing circuit being configured to:
combine pixel signals from the plurality of exposures into a single combined image by choosing, for a given pixel location, a pixel signal value from one of the plurality of exposures;
at each pixel location, detect motion between at least two of the plurality of exposures, wherein the processing circuit is configured to detect motion at a particular pixel location by determining if a difference between a pixel signal value at the particular pixel location from a second of the plurality of exposures and a pixel signal value at the particular pixel location from a first of the plurality of exposures is less than a non-zero motion detection threshold; and
correct the combined image to correct for image artifacts caused by detected motion, wherein correcting the combined image comprises removing motion outline artifacts and noise artifacts and wherein the processing circuit is configured to remove motion outline artifacts by replacing a pixel signal value from a first of the plurality of exposures with a pixel signal value from a second of the plurality of exposures, for pixel locations for which motion is detected, the second exposure having a shorter integration period than the first exposure.

19. The imaging device of claim 18, wherein the processing circuit is configured to remove noise artifacts by performing noise filtering on pixels for which a replacement pixel signal value is less than a brightness threshold, wherein the replacement pixel signal value is a pixel signal value from a second of the plurality of exposures that has replaced a pixel signal value from a first of the plurality of exposures, for pixel locations for which motion is detected.

20. The imaging device of claim 18, wherein the processing circuit is further configured to detect motion at a particular pixel location by:
determining if a number of pixels having detected motion that surround the particular pixel is greater than a count threshold.

* * * * *